United States Patent
Li

(10) Patent No.: US 10,626,513 B1
(45) Date of Patent: Apr. 21, 2020

(54) WATER ELECTROLYSIS HYDROGEN PRODUCTION PLANT WITH A PUMPLESS WATER SUPPLY SYSTEM AND PROCESS FLOW METHOD

(71) Applicant: Haiming Li, Stoughton, MA (US)

(72) Inventor: Haiming Li, Stoughton, MA (US)

( * ) Notice: Subject to any disclaimer, the term of this patent is extended or adjusted under 35 U.S.C. 154(b) by 0 days.

(21) Appl. No.: 16/728,337

(22) Filed: Dec. 27, 2019

(51) Int. Cl.
   *C25B 15/02* (2006.01)
   *C25B 15/08* (2006.01)
   *C25B 9/08* (2006.01)
   *C25B 1/10* (2006.01)

(52) U.S. Cl.
   CPC .............. *C25B 15/02* (2013.01); *C25B 1/10* (2013.01); *C25B 9/08* (2013.01); *C25B 15/08* (2013.01)

(58) Field of Classification Search
   CPC ...... C25B 1/02–12; C25B 15/02; C25B 15/08
   See application file for complete search history.

(56) References Cited

U.S. PATENT DOCUMENTS

2013/0264195 A1* 10/2013 Zhou ................... C25B 1/08
204/228.2

FOREIGN PATENT DOCUMENTS

JP    2018034147 A  *  3/2018

\* cited by examiner

*Primary Examiner* — Nicholas A Smith

(57) ABSTRACT

The invention discloses a water electrolysis hydrogen production plant with a pumpless water supply system. The plant includes a water treatment system, a water tank, a water electrolysis device, and a controller. The water treatment system, water tank and water electrolysis device are sequentially connected together via pipelines and associated valves. Compressed gas is connected, via a pipeline, to the water tank, and serves to drive water from the water tank into the water electrolysis device. A process flow for the method of operating the pumpless water supply system in a water electrolysis hydrogen production plant is also disclosed.

16 Claims, 2 Drawing Sheets

WATER ELECTROLYSIS HYDROGEN PRODUCTION PLANT WITH A PUMPLESS WATER SUPPLY SYSTEM AND PROCESS FLOW METHOD

TECHNICAL FIELD

The invention relates generally to hydrogen production equipment, and more specifically to water supply systems for electrolysis hydrogen production plants and associated process flow methods.

BACKGROUND OF INVENTION

Existing automatic water supply systems as used in water electrolysis hydrogen production plants generally include a water pump device. Since hydrogen is a flammable and explosive gas, hydrogen production plant involves explosion-proof electrical components within the system, including the water supply system. The cost and maintenance of explosion-proof components are expensive, and involve frequently starting up during the operation and maintenance. Water pump devices in existing water supply systems are susceptible to malfunction if started up frequently, which increases maintenance and replacement costs, disrupts normal production, and causes economic loss.

SUMMARY

Provided herein is an approach for water supply in water electrolysis hydrogen production plants that use compressed gas, such as compressed air or nitrogen, as a power source to drive water where needed in order to solve the above problem by avoiding the use of an expensive explosion-proof water pump in the automatic water supply system. Beneficially, a pumpless water supply system and its associated process flow reduce the overall risk as well as the cost of maintaining and operating the hydrogen production plant.

In various embodiments, the water electrolysis hydrogen production plant with a pumpless water supply system includes a water (e.g., deionized (DI) water) treatment system, a water (e.g., DI-water) tank, a water electrolysis device, and a controller (e.g., a programmable logic controller (PLC) or customized circuit board controller). The water electrolysis device includes an oxygen washer, an oxygen-electrolyte separator, a hydrogen washer, a hydrogen-electrolyte separator, and an electrolyzer. All the components in water electrolysis device are fluidically connected together. The input of the water tank connects with the output of the water treatment system through a water supply pipeline, which may include a water supply control valve. The output of water tank is connected to the oxygen washer through a water replenish pipeline, which may include a check valve for preventing backflow from the oxygen washer into the water tank. A compressed gas (e.g., compressed air or nitrogen) line is connected to the water tank and serves to drive water received from the water treatment system in the water tank to the oxygen washer by means of compressed gas (e.g., air or nitrogen). A compressed gas supply control valve may be included in the compressed gas line. A liquid-level monitor system (e.g., liquid-level sensors) in the water tank and the oxygen-electrolyte separator, can set liquid-level low-limit values and liquid-level high-limit values for the water tank and the oxygen-electrolyte separator (In various embodiments, first high/low-limit values for oxygen-electrolyte separator and second high/low-limit values for water tank will be described. The term "first," "second," and the like in the summary, description and the claims, if any, may be used for distinguishing between similar elements and not necessarily for describing a particular sequential or chronological order. It is to be understood that the terms so used are interchangeable). The controller and liquid-level monitor systems are communicatively connected with each other along with the control valves (e.g., pneumatic or solenoid valves) in the system.

Further, in order to vent the compressed gas, an exhaust pipe, which may include an exhaust control valve, is installed on the water tank.

Also discloses herein is a process flow method for operating a pumpless water supply system in a water electrolysis hydrogen production plant. The method comprises the following steps:

Step 1: When the water electrolysis hydrogen production plant is being operated, the controller monitors the water levels measured by the liquid-level monitor systems in the water tank and oxygen-electrolyte separator relative to specified high/low-limit values. (The second high-limit and second low-limit values specified for the water tank are separate and generally different from the first high-limit and first low-limit values specified for the oxygen-electrolyte separator.), When the water tank level reaches the second low-limit value, the process goes to step 2 for water refill. When the water tank level is above the second low-limit value, and the water level in the oxygen-electrolyte separator of the electrolysis device reaches its first low-limit value, the process goes to step 3 for water replenish.

Step 2: When the liquid level in water tank falls below the specified second low-limit value, a corresponding signal is sent to the controller. After the controller acquiring the signal, the water supply control valve at the outlet of the water treatment system is controlled to open, the exhaust control valve is controlled to open at the same time, and water is filled into the water tank. When the liquid level in the water tank rises above the second high-limit value, the controller controls the water supply control valve at the outlet of the water treatment system as well as the exhaust valve in the exhaust pipe to be closed, and thereby stops refilling the water tank with water (e.g. DI-water from water treatment system).

Step 3: Compressed gas (such as compressed air or nitrogen) is used to drive the pure water, which received in the water tank from the water treatment system, from the water tank into the oxygen washer of the water electrolysis system.

The liquid level in the oxygen-electrolyte separator is monitored by the liquid-level monitor system in the oxygen-electrolyte separator. When the oxygen-electrolyte separator's liquid level falls below a specified first low-limit value, a corresponding signal is sent to the controller. After the controller acquiring the signal, the compressed gas supply control valve on the compressed gas line is controlled to open, and the water electrolysis device is replenished with water through oxygen washer. When the water level in the oxygen-electrolyte separator rises above a specified first high-limit value, the controller controls the compressed gas supply control valve on the compressed gas line to be closed, and thereby ceases to replenish the water electrolysis device with water. In the process of water replenish to the water electrolysis device, the liquid level in the water tank can fall below the second low-limit value. Once level in the water tank is lower than the second low-limit value, replenishment to the water electrolysis device is stopped, and the process proceeds to step 2 to refill the water tank.

Since the hydrogen and oxygen washer are connected, water can be replenished, in step 3, to the oxygen washer or hydrogen washer. Accordingly, where this specification refers to water replenishment to the oxygen washer, it is to be understood that the hydrogen washer could be substituted for the oxygen washer.

Further, the air or nitrogen source outside the compressed gas line is generally maintained at a pressure greater than the pressure inside the water electrolysis device.

The water electrolysis hydrogen production plant with a pumpless water supply system and the associated process flow method are used for supplying the water into the water electrolysis device. Compared with existing water supply systems with automatic pumps, the disclosed system and method have significant advantages. Compressed gas (e.g., air or nitrogen) is used as the power source to drive the water into the oxygen washer of water electrolysis device, replacing the explosion-proof water pump used in conventional systems, which malfunctions easily due to frequent start-ups, is troublesome to maintain and replace. Thereby, risks are reduced and overall system safety is improved.

BRIEF DESCRIPTION OF THE FIGURES

The disclosed invention will be described with reference to the accompanying drawings, which show important sample embodiments of the invention and are incorporated in the specification hereof by reference, wherein.

DETAILED DESCRIPTION OF EXAMPLE EMBODIMENTS

Figure 1:
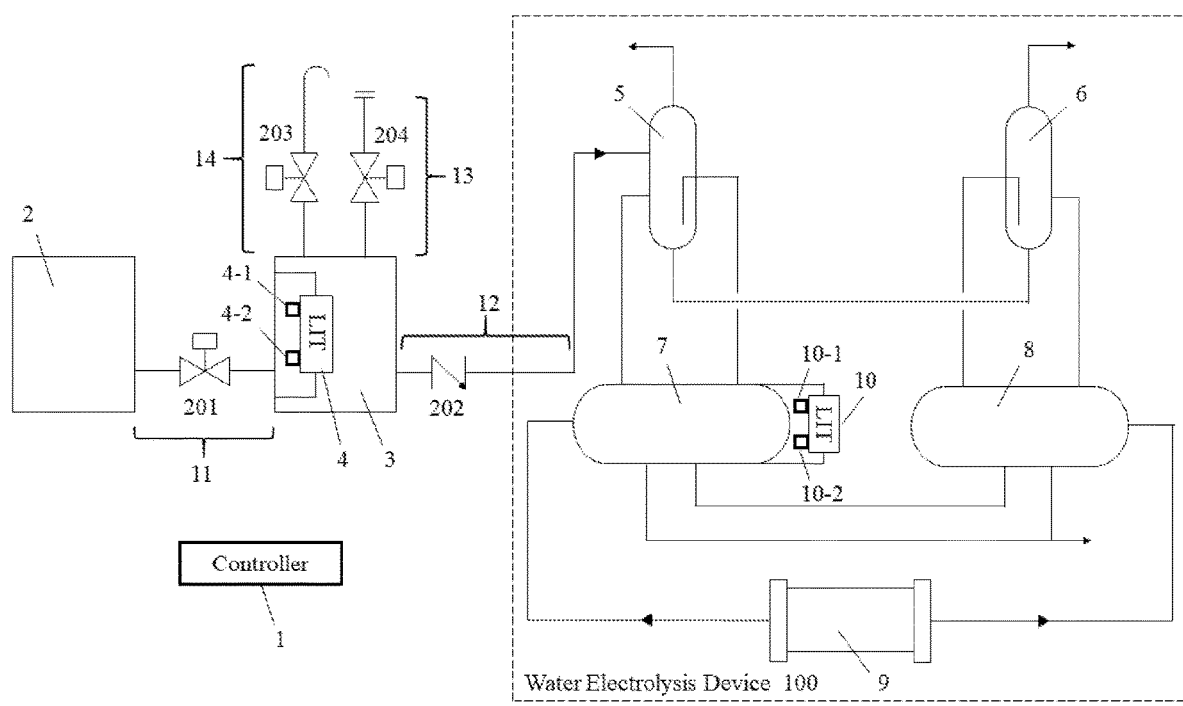
FIG. 1 is a schematic diagram of the water electrolysis hydrogen production plant with a pumpless water supply system in accordance with various embodiments.
Figure 2:
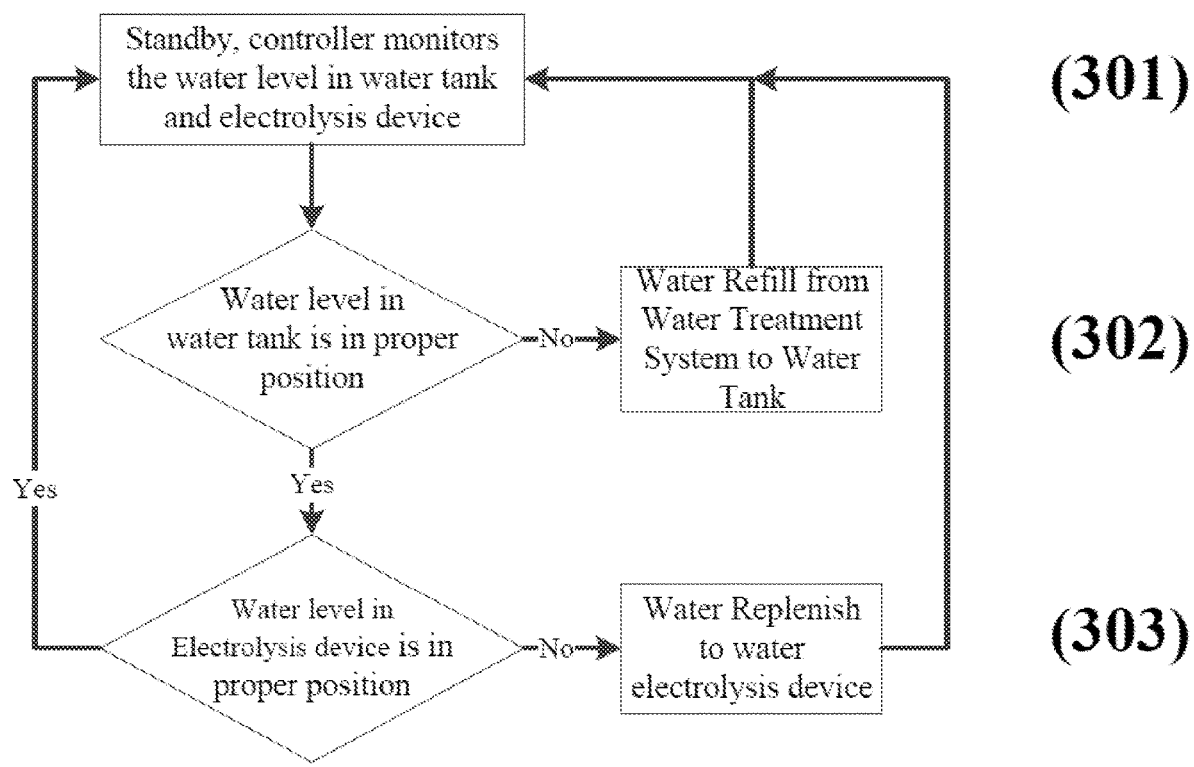
FIG. 2 is a flow chart illustrating a process flow for a method of supplying a water electrolysis hydrogen production plant with water using a pumpless water supply system in accordance with various embodiments.

FIGS. 1 and 2 illustrate, with a schematic diagram and flow chart, an example implementation of pumpless water supply for hydrogen electrolysis system.

FIG. 1 is a schematic diagram of a water electrolysis hydrogen production plant with a pumpless water supply system in accordance with various embodiments. As shown, a water electrolysis hydrogen production device with a pumpless water supply system shown by this example includes water treatment system (2), water tank (3), water electrolysis device (100) and controller (1). The water electrolysis device (100) is used to split water into oxygen and hydrogen gas due to the electric current working. The water electrolysis device includes oxygen washer (5), oxygen-electrolyte separator (7), hydrogen washer (6), hydrogen-electrolyte separator (8) and electrolyzer stack (9). The oxygen washer (5) connects fluidically with hydrogen washer (6) (meaning that fluid can flow from the oxygen washer to the hydrogen washer). The oxygen washer (5) connects fluidically with oxygen-electrolyte separator (7). The hydrogen washer (6) connects fluidically with hydrogen-electrolyte separator (8). The oxygen-electrolyte separator (7) connects fluidically with hydrogen-electrolyte separator (8) and electrolyzer stack (9). The oxygen-electrolyte separator (7) connects fluidically with hydrogen-electrolyte separator (6).

The input of water tank (3) connects fluidically with output of water treatment system (2) through water supply pipeline (11). A water supply control valve (201), which can be a solenoid or pneumatic valve with open/close function, is installed on the water supply pipeline (11). The output of water tank (3) is connected to the oxygen washer (5) through the water replenish pipeline (12). A check valve (202) for preventing backflow from the oxygen washer is installed on the water replenish pipeline (12). The compressed gas line (13) for driving water from the water tank (3) to the oxygen washer (5) by means of compressed air or nitrogen is also connected to the water tank (3). A compressed gas supply control valve (204) is connected to the compressed gas line (13). Liquid-level monitor systems (4, 10), which can set liquid-level low-limit (4-2, 10-2) and high-limit values (4-1, 10-1), are disposed in the water tank (3) and oxygen-electrolyte separator (7). Further, in order to vent the compressed gas, an exhaust pipe (14) is installed on the water tank (3). A compressed gas exhaust control valve (203) is installed on the exhaust pipe (14).

The controller (1) and liquid-level monitor systems (4, 10) are electrically connected with control valves (201, 203, and 204), which may be solenoid valves and/or pneumatic valves with function of on and off.

FIG. 2 illustrates a process flow for a method of replenishing a water electrolysis device with water using a pumpless water supply system in accordance with various embodiments. The method comprises the following steps:

Step 1 (301): When the pumpless water electrolysis system is being operated, the controller (1) monitors the water high-limit values (4-1, 10-1) and low-limit values (4-2, 10-2) of liquid-level monitor systems (4, 10) in the water tank (3) and oxygen-electrolyte separator (7). If the water tank level monitor system (4) reaches the second low-limit value (4-2), the process goes to step 2 for water refill. If the water tank level does not reach the second low-limit value (4-2), and water electrolysis system water level monitor system (10) reaches its first low-limit value (10-2), the process goes to step 3 for water replenish.

Step 2 (302): When the liquid level is lower than the second low-limit value (4-2), a signal is sent to the controller (1), which, in response to the signal, controls the water supply control valve (201) at the outlet of the water treatment system (2) to open, and the exhaust control valve (203) to open at the same time, such that water is filled into the water tank (3) though the water supply pipeline (11) from the water treatment system (2). When the liquid level in the water tank (3) reaches the second high-limit value (4-1), the controller (1) controls the water supply control valve (201) at the outlet of the water treatment system (2) and the exhaust control valve (203) in exhaust pipe (14) to be closed, and stops refilling the water tank (3).

Step 3 (303): Compressed gas (e.g. compressed air or nitrogen) is used to drive the water received from the water treatment system (2) in the water tank (3) into the oxygen washer (5) of the water electrolysis device (100);

The liquid level in the oxygen-electrolyte separator (7) is monitored by liquid-level monitor system (10). When the liquid level is lower than the first low-limit value (10-2), a signal is sent to the controller (1). In response to receipt of the signal, the controller (1) controls the compressed gas supply control valve (204) on the compressed gas line (13) to open, such that the is replenished the water electrolysis device (100) with water through oxygen washer (5). When the water level in the oxygen-electrolyte separator (7) is higher than the first high-limit value (10-1), controller (1) controls the compressed gas supply control valve (204) on the compressed gas line (13) to be closed, and thereby stops to replenish the oxygen washer (5) with water.

Since oxygen and hydrogen washers (5, 6) are connected, the water can be replenished to the oxygen or hydrogen washer (5, 6) in step 3.

Further, for convenience of venting compressed gas, an exhaust pipe (14) is set in the water tank (3). When the controller (1) receives the signal that the liquid level in the oxygen-electrolyte separator (7) is above the first high-limit value (10-1), water replenishment is complete, and the controller (1) controls the compressed gas exhaust control valve (203) on the exhaust pipe (14) to open and vent compressed gas.

In order to improve security, the air or nitrogen pressure outside the compressed gas pipeline (13) is greater than the pressure inside the water electrolysis device (100), to be specific, pressure inside the oxygen water (5).

The workflow of the invention is:

The liquid level in the water tank (3) reaches the second low-limit value (4-2) set by the water tank liquid-level monitor system (4), and the controller (1) controls the water supply control valve (201) and the compressed gas exhaust control valve (203) to open, causing water to be supplied to the water tank (3). When the liquid level in water tank (3) reaches the second high-limit set point (4-1), the water supply control valve (201) and the compressed gas exhaust control valve (203) are both closed. The process of water supply to water tank is completed.

When the liquid level in the oxygen-electrolyte separator (7) reaches the first low-limit value (10-2), the compressed gas supply control valve (204) is controlled to open. The water in the water tank (3) is started to be compressed and thereby driven into the water electrolysis device (100) through oxygen washer (5). When the liquid level in the oxygen-electrolyte separator (7) reaches the first high-limit value (10-1), the compressed gas supply control valve (204) is controlled to be closed, and the water replenish process to the water electrolysis device (100) is completed. In the process of water supply into the water electrolysis device (100), the liquid level in the water tank (3) can fall below than the second low-limit value (4-2). Once level in the water tank (3) is lower than the second low-limit value (4-2), the system stops replenishing process, and starts the water tank refill process in step 2 (302).

The described system and process are used for replenishing the raw material water that is used in the water electrolysis device (100). The disclosed water supply system has a significant advantage compared with existing water supply systems with automatic water pumps. Compressed air or nitrogen is used as the power source to drive the water into the water electrolysis device (100) through the oxygen washer (5) to replace the explosion-proof water pump.

The controller (1) and all types of control valves (201, 203 and 204), check valve (202) described in the example are readily commercially available. The controller (1) will control the opening and closing of the control valve based on data information change after controller (1) receives the signal, in ways known to those of ordinary skill in the art and therefore not described in detail herein.

The above description shows the basic principles, features, and benefits of embodiments of the invention. The invention is not limited to the details of the example system and process flow described above, but may be realized in other specific forms, without deviating from basic characteristics or falling outside the scope of the invention. Hence, the examples should be considered as illustrative and non-restrictive. The scope of the invention is defined by the attached claims and their equivalents.

What is claimed is:

1. A water electrolysis hydrogen production plant comprising:
   a water treatment system;
   a water tank, an input of the water tank connecting to an output of the water treatment system via a water supply pipeline comprising at least one control valve;
   a water electrolysis device including an oxygen washer, an oxygen-electrolyte separator, a hydrogen washer, a hydrogen-electrolyte separator, and an electrolyzer, the oxygen washer connecting to an output of the water tank via a water replenish pipeline comprising at least one check valve;
   a compressed gas line connecting to the water tank to drive water from the water tank into the oxygen washer, the compressed gas line comprising at least one control valve;
   an exhaust pipe connecting to the water tank;
   liquid-level monitor systems communicatively connecting to, and configured to monitor liquid levels in, the water tank and oxygen-electrolyte separator; and
   a controller configuring to operate the valves in the water supply and replenish pipelines and the compressed gas line, based at least in part on signals from the liquid-level monitor systems, to supply water from the water treatment system to the water tank and drive water from the water tank to the oxygen washer by means of compressed gas received through the compressed gas line.

2. The water electrolysis hydrogen production plant of claim 1, wherein the control valve has function of on and off.

3. The water electrolysis hydrogen production plant of claim 1, wherein the compressed gas comprises compressed air or nitrogen.

4. The water electrolysis hydrogen production plant of claim 1, wherein the water tank contains deionized (DI) water.

5. The water electrolysis hydrogen production plant of claim 1, wherein the controller is at least one of a programmable logic controller and/or a customized circuit board controller.

6. The water electrolysis hydrogen production plant of claim 1, wherein the exhaust pipe comprising at least one control valve.

7. The water electrolysis hydrogen production plant of claim 1, wherein the liquid-level monitor systems comprising, in each of the water tank and the oxygen-electrolyte separator, a liquid-level sensor.

8. The water-electrolysis hydrogen production plant of claim 1, wherein the control valves include at least one of a solenoid valve or a pneumatic valve.

9. The water-electrolysis hydrogen production plant of claim 1, wherein the liquid-level monitor systems are installed in the water tank and the oxygen-electrolyte separator, wherein the liquid-level monitor system
   in the oxygen-electrolyte separator is configured to set the first liquid-level low-limit value and the first liquid-level high-limit value, and wherein the liquid-level monitor system
   in the water tank is configured to set the second liquid-level low-limit value and the second liquid-level high-limit value.

10. The water-electrolysis hydrogen production plant of claim 1, wherein the controller operates the control valves based on a comparison of the liquid levels in the oxygen-electrolyte separator and the water tank respectively, against the oxygen-electrolyte separator's and water tank's liquid-level low-limit and high-limit values.

11. A process flow method for operating a pumpless water supply system in a water electrolysis hydrogen production plant, the method comprising: using compressed gas to drive water from a water tank into a water electrolysis device of the water electrolysis hydrogen production plant; monitoring a liquid level in the water electrolysis device by a liquid-level monitor system, the liquid-level monitor system configured to send a signal to a controller when the liquid level falls below a first low-limit value and when the liquid level rises above a first high-limit value; in response to the liquid level in the water electrolysis device falling below the first low-limit value, opening, by the controller, a control valve in a compressed gas line to replenish the water electrolysis device with water; in response to the liquid level in the water electrolysis device rising above the first high-limit value, closing, by the controller, the control valve in the compressed gas line; monitoring a liquid level in the water tank by the liquid-level monitor system, the liquid-level monitor system configured to send a signal to the controller when the liquid level falls below a second low-limit value and when the liquid level rises above a second high-limit value; in response to the liquid level in the water tank falling below the second low-limit value, opening, by the controller, a control valve at an outlet of a water treatment system connected to an input of the water tank, a control valve at the exhaust pipe of the water tank being open, to supply water to the water tank; and in response to the liquid level in the water tank rising above the second high-limit value, closing, by the controller, the control valve at the outlet of the water treatment system and the control valve at the exhaust pipe.

12. The method of claim 11, wherein the compressed gas comprises compressed air or nitrogen.

13. The method of claim 11, wherein the water electrolysis device comprises an oxygen washer and a hydrogen washer, and wherein replenishing the water electrolysis device with water comprises replenishing an electrolyte washer with water at an oxygen end or at an hydrogen end.

14. The method of claim 11, further comprising, in response to the liquid level in the water electrolysis device rising above the first high-limit value, opening, by the controller, the exhaust control valve in the exhaust pipe connected to the water tank to discharge the compressed gas from the water tank.

15. The method of claim 11, wherein, in each operational cycle, water replenishment to the electrolysis device stops in the process once the second low-limit value is detected by the controller, and starts the water refill process to the water tank instead.

16. The method of claim 11, wherein a gas pressure from the compressed gas line is greater than a pressure inside the water electrolysis device.

* * * * *